US008566729B2

(12) United States Patent
Komine et al.

(10) Patent No.: US 8,566,729 B2
(45) Date of Patent: Oct. 22, 2013

(54) JOINT EDITING OF AN ON-LINE DOCUMENT

(75) Inventors: Hiroaki Komine, Yokohama (JP); Atsushi Ono, Tokyo (JP); Atsushi Sato, Yokohama (JP); Tatsuya Sobue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 12/568,582

(22) Filed: Sep. 28, 2009

(65) Prior Publication Data
US 2010/0083136 A1  Apr. 1, 2010

(30) Foreign Application Priority Data

Sep. 29, 2008  (JP) ................................. 2008-251825

(51) Int. Cl.
*G06F 17/00* (2006.01)
*G06F 3/00* (2006.01)

(52) U.S. Cl.
USPC ............................ 715/751; 715/203; 715/753

(58) Field of Classification Search
USPC .......................... 715/203, 230, 255, 751, 753
See application file for complete search history.

(56) References Cited

U.S. PATENT DOCUMENTS

| 7,496,841 | B2* | 2/2009 | Hadfield et al. | ............... | 715/255 |
| 7,870,493 | B2* | 1/2011 | Pall et al. | ....................... | 715/751 |
| 2003/0112273 | A1* | 6/2003 | Hadfield et al. | ............... | 345/751 |
| 2006/0026502 | A1* | 2/2006 | Dutta | ............................ | 715/511 |
| 2007/0101256 | A1* | 5/2007 | Simonyi | ........................ | 715/511 |
| 2007/0186157 | A1* | 8/2007 | Walker et al. | ................. | 715/530 |

FOREIGN PATENT DOCUMENTS

| JP | 05028138 | 2/1993 |
| JP | 05074942 | 3/1993 |
| JP | 05074943 | 3/1993 |
| JP | 06202927 | 7/1994 |
| JP | 07036947 | 2/1995 |
| JP | 07160631 | 6/1995 |
| JP | 07-182369 A | 7/1995 |
| JP | 07175842 | 7/1995 |
| JP | 08227453 | 9/1996 |
| JP | 10-134002 A | 5/1998 |
| JP | 2001312478 | 11/2001 |
| JP | 2002222185 | 8/2002 |
| JP | 2002342385 | 11/2002 |
| JP | 2003186914 | 7/2003 |
| JP | 2004110714 | 4/2004 |
| JP | 2004326176 | 11/2004 |
| JP | 2008-210192 | 9/2008 |
| WO | 2006051905 | 5/2006 |

OTHER PUBLICATIONS

Japanese Patent Office Application No. 2008-251825, Filed Sep. 29, 2008—Office Action Dated Dec. 18, 2002, pp. 1-4 (Includes English Translation of References to Non-Patent Literature Cited in JPO Office Action).

(Continued)

*Primary Examiner* — Haoshian Shih
(74) *Attorney, Agent, or Firm* — A. Bruce Clay

(57) ABSTRACT

An editing apparatus efficiently performs cooperative editing of a document. Multiple users can edit a document in parallel using the editing apparatus which includes a screen output section, an editing screen, a section for receiving, a selection input section for inputting, and an update section for reflecting the edited content selected by a selection instruction, and updating the document.

20 Claims, 8 Drawing Sheets

(56) References Cited

OTHER PUBLICATIONS

Ryouta Tamaki, "The Future of Office Software," Nikkei Computer, Japan, Nikkei BP, May 29, 2006, No. 653, pp. 62-68.

Monma Nobuyuki et al., "Techniques for Gathering Information of People on a Network Using Co-Authoring," Information Processing Society of Japan Report, Japan, Information Processing Society of Japan Inc., September 18, 1997, vol. 97, No. 91, pp. 7-12.

Tabuchi Hitohiro et al., "Groupware and CSCW vol. 2: Basic Techniques for Information Sharing," Human Interface Society Journal, Japan, Human Interface Society, May 30, 2000, vol. 2, No. 2, pp. 92-101.

* cited by examiner

| USER | LAYER | DOCUMENT PART | EDITED CONTENT | TIMESTAMP | ACCEPTANCE/REJECTION INFORMATION |
|---|---|---|---|---|---|
| A | 1 | 56 | "USE XXX" → "NOT USE XXX" | 080528 / 154510 | ACCEPTED |
| B | 1 | 123 | ADD ○△□ | 080528 / 160231 | ACCEPTED |
| B | 2 | ... | ... | ... | REJECTED |
| B | 3 | ... | ... | ... | UNDECIDED |
| C | 1 | ... | ... | ... | UNDECIDED |
| ∼ | ∼ | ∼ | ∼ | ∼ | ∼ |

JOINT EDITING OF AN ON-LINE DOCUMENT

FIELD OF THE INVENTION

The present invention relates to an editing apparatus, and more specifically, an editing apparatus that allows joint editing of an on-line document.

BACKGROUND OF THE INVENTION

Joint editing of documents on-line is a fairly common activity. When a document is edited in real time by more than one person while they are discussing the document, if each user is allowed to edit the document freely at any time or if the user has acquired a right to exclude others, there is a possibility of changing document portions unrelated to the content about which they are discussing. In this case, the results of the joint edit cannot be reflected in the document until the proper authority does so.

Another technique involves pre-registering part of a document as editable by a specific user. This is not only inconvenient, but also limits the number of users able to edit each portion of the document, resulting in insufficient discussions as a whole. In some cases a lead user can permit a specific user to make a change. However, the change must be permitted on a user-by-user basis, and this may make it difficult to reflect the content in each portion of the document.

SUMMARY OF THE INVENTION

In a first aspect of the present invention, there is provided an editing apparatus for allowing a plurality of users to edit a document in parallel. The editing apparatus includes a screen output section for outputting to each of a plurality of terminals used by the users, and an editing screen to edit the document in parallel with other terminals. An operation input section, receives from the terminals, edited content from the users input by operating the editing screen on the terminals. A selection input section allows an instruction input from an administrator of the document for selecting from among the edited content from the users. The edited content selected is to be reflected in the document. An update section reflects in the document the edited content and updates the document screen output section to output, respectively, to the terminals used by the users. An editing screen allows each terminal to edit the document in parallel with the other terminals. An operation input section receives from the terminals, edited contents from the users operating the editing screen on the terminals. A selection input section allows input from an administrator of the document through a selection instruction.

BRIEF DESCRIPTION OF THE SEVERAL VIEWS OF THE DRAWINGS

The foregoing and other features and advantages of the present invention will be more fully understood from the following detailed description of illustrative embodiments, taken in conjunction with the accompanying drawings, in which:

FIG. 7 shows an exemplary table stored in an edited content recording section 230 according to an embodiment.

DETAILED DESCRIPTION OF THE INVENTION

Figure 1:
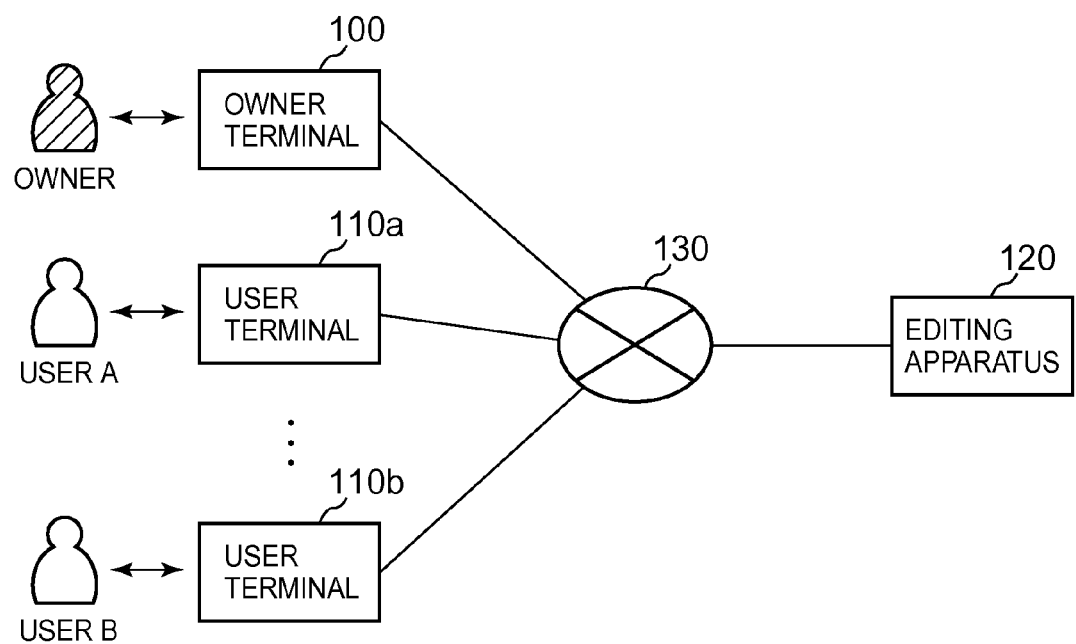
FIG. 1 is a block diagram showing a configuration of an editing system according to an embodiment.

FIG. 1 shows a configuration of an editing system 10 according to one embodiment. The editing system 10 helps a plurality of users edit a common document using a plurality of terminals 110 during a group discussion, a Web conference, or the like.

To be more specific, the editing system 10 allows each user to input one or more edited content of the document, and an administrator of the document (hereinafter called "owner") to select, from among the input edited contents, an edited content to be reflected in the document. Then, the editing system 10 reflects the selected edited content in the document. This allows the owner and each user to decide upon an edited content version to be reflected in the document in response to an explicit selection of the owner after discussions on the edited content input by the respective users.

The editing system 10 includes an owner terminal 100, one or more user terminals 110a and 110b, an editing apparatus 120, and a network 130. The owner terminal 100 is used by the owner of the document which is to be edited jointly among the owner terminal 100 and the plural user terminals 110. The plural user terminals 110 are used by plural users, respectively, to output an editing screen to the users, and allow the user to input an edited content of the document, screen operations, and the like.

For example, the document may be text, a word-processor document, a structured document such as HTML or XML, a drawing edited by a CAD tool, an image, or a presentation. Instead, the editing system 10 may be a system for allowing plural users to edit data or information, such as audio data and/or video data, in parallel with each other. In addition, the editing system 10 determines whether editing performed by two or more users on parts of the document conflicts with each other, or not. The document part may be, for example, a sentence, paragraph, chapter, or section in text, an area or the like obtained by dividing a basic graphical element or a sheet such as a polygon in a drawing, a section or the like in a structured document, or a slide or the like in a presentation.

The editing apparatus 120 is connected with the owner terminal 100 and the user terminals 110 through the network 130 to allow the users to edit a document managed by the editing apparatus 120 in parallel with each other. The network 130 may be, for example, the Internet, an intranet, or a local-area network to connect the editing apparatus 120 with the owner terminal 100 and the plural user terminals 110 over a wire or wireless.

In the above configuration, the owner terminal 100 and the user terminals 110, or at least some of these terminals, may be placed at remote locations where these owner or users cannot directly communicate with the other owner or users. Therefore, the editing system 10 may be configured such that the audio of statements of each user and/or images obtained by imaging each user are exchanged through the network 130 so that the owner and the users can communicate with each other. Alternatively, the editing system 10 may be configured such that the owner and the users gathered in the same conference room connect the owner terminal 100 and the user terminals 110 through the network 130 such as a LAN to edit a document in collaboration with each other.

Further, in the above configuration, a user selected from the plurality of users may also serve as the owner. In this case, the user terminal 110 of the user also functions as the owner terminal 100.

Figure 2:
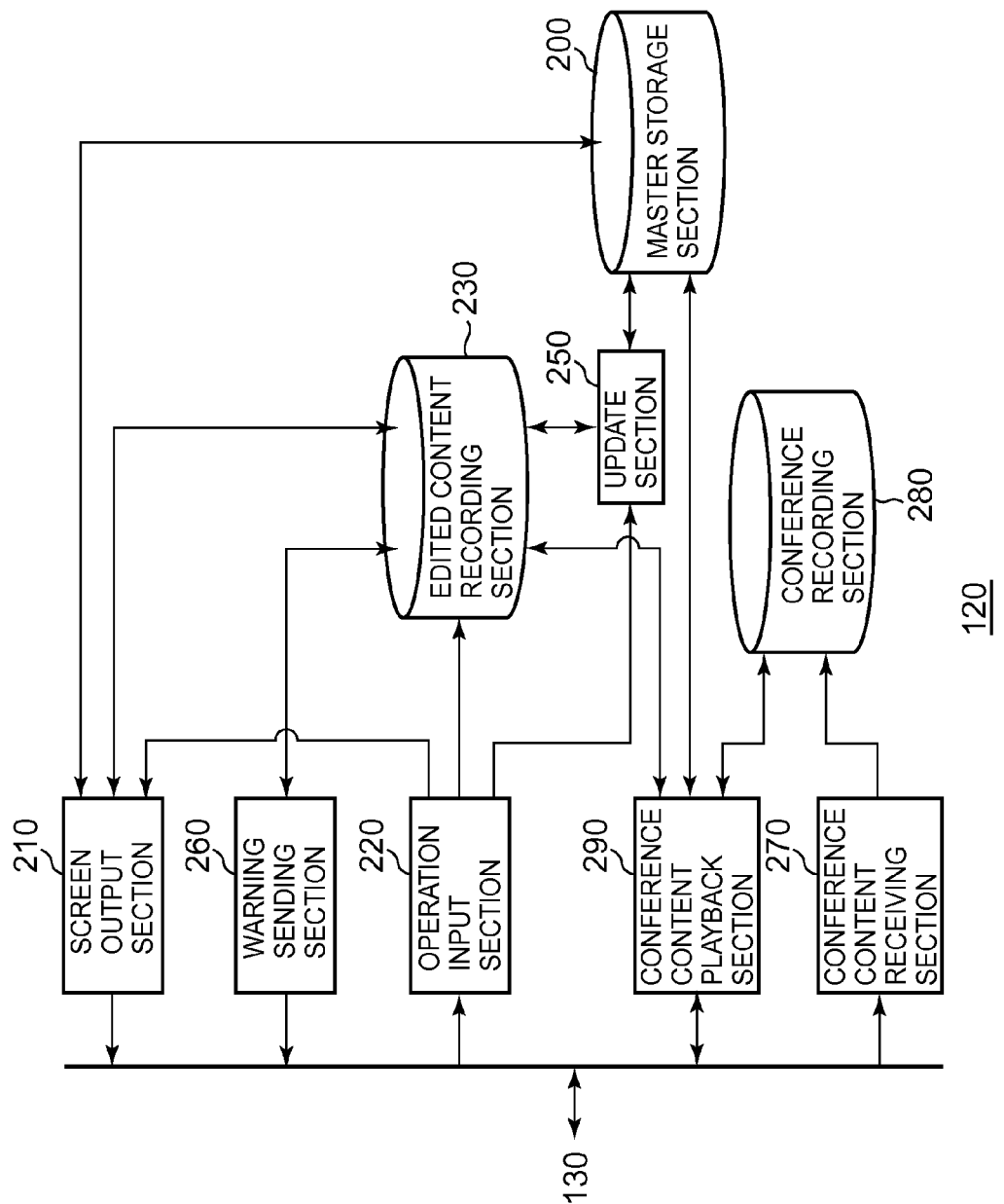
FIG. 2 is a block diagram showing a configuration of an editing apparatus according to an embodiment.

FIG. 2 shows a configuration of the editing apparatus 120 according to an embodiment of the present invention. The editing apparatus 120 includes a master storage section 200, a screen output section 210, an operation input section 220, an edited content recording section 230, an update section 250, a warning sending section 260, a conference content receiving section 270, a conference recording section 280, and a conference content playback section 290.

The master storage section 200 stores a master of a document to be edited by collaboration work among the owner and the plurality of users. The screen output section 210 outputs screens respectively to the user terminals 110 and the owner terminal 100. In other words, an editing screen is output to the user terminals 110 used by the plurality of users, respectively, to allow each terminal to edit the document in parallel with the other user terminal(s) 110. Also, the screen output section 210 reads, from the edited content recording section 230, edited content(s) edited by the other user(s) but not yet reflected in the master of the document and outputs the read edited content(s) as a reference screen to each of the user terminals 110. Further, the screen output section 210 outputs, to the owner terminal 100, the content edited by respective users and a selection screen which allows the owner to select edited content to be reflected in the document.

The operation input section 220 receives, through the network 130, operations of the owner and the users performed on the owner terminal 100 and the user terminals 110, and instructs the screen output section 210, the edited content recording section 230, and the update section 250 to perform processing corresponding to the received operations. Then, when receiving edited content input by the users operating the editing screen on their respective terminals, the operation input section 220 stores the received edited contents in the edited content recording section 230. The operation input section 220 also functions as a selection input section which, when instructions for selecting an edited content to be reflected in the document from among the edited contents of users is input from the owner of the document, passes the received selection instruction to the update section 250 to update the document. Further, when receiving the operations on the screen from the owner terminal 100 and the user terminals 110, the operation input section 220 instructs the screen output section 210 to output a screen corresponding to each of the operations.

The edited content recording section 230 stores one or more edited content input by each of the users. Among the edited content stored in the edited content recording section 230, the update section 250 reflects, in the document, the edited content selected by the owner's selection instruction received from the owner terminal 100 to update the document. The warning sending section 260 monitors the edited content stored in the edited content recording section 230 to determine whether the same document part (among a plurality of document parts obtained by dividing the document) is being edited by two or more user terminals 110. If the same document part is being edited on two or more user terminals 110, the warning sending section 260 sends a warning message to the respective users of the two or more user terminals 110.

The conference content receiving section 270 receives content from the users and the owner from the user terminals 110 and/or the owner terminal 100. The conference content receiving section 270 may receive content such as, for example, conference video, conversations, and chat content from the users and the owner. In other words, the conference content receiving section 270 may receive, through the network 130, statements and/or images from each user acquired from a microphone, a camera, and/or a camcorder equipped in each of the owner terminal 100 and/or the user terminals 110. Further, the conference content receiving section 270 may receive, through the network 130, a chat content or screen operations input by each user on his or her terminal. In the case where the owner and the respective users gather in the same space to hold a meeting, the conference content receiving section 270 may acquire statements and/or images of each user acquired from a microphone, a camera, and/or a camcorder connected to the editing apparatus 120.

The conference recording section 280 receives conference content from the users and the owner from the conference content receiving section 270, and records the received conference content. The conference recording section 280 appends timestamps to the conference content so that discussions corresponding to time can be extracted later. The conference content playback section 290 receives playback instructions from each of the owner and/or users via the owner terminal 100 and/or the user terminals 110 to play back a portion specified by the playback instruction from the conference content recorded in the conference recording section 280, and send it to the requesting terminal(s).

Figure 3:
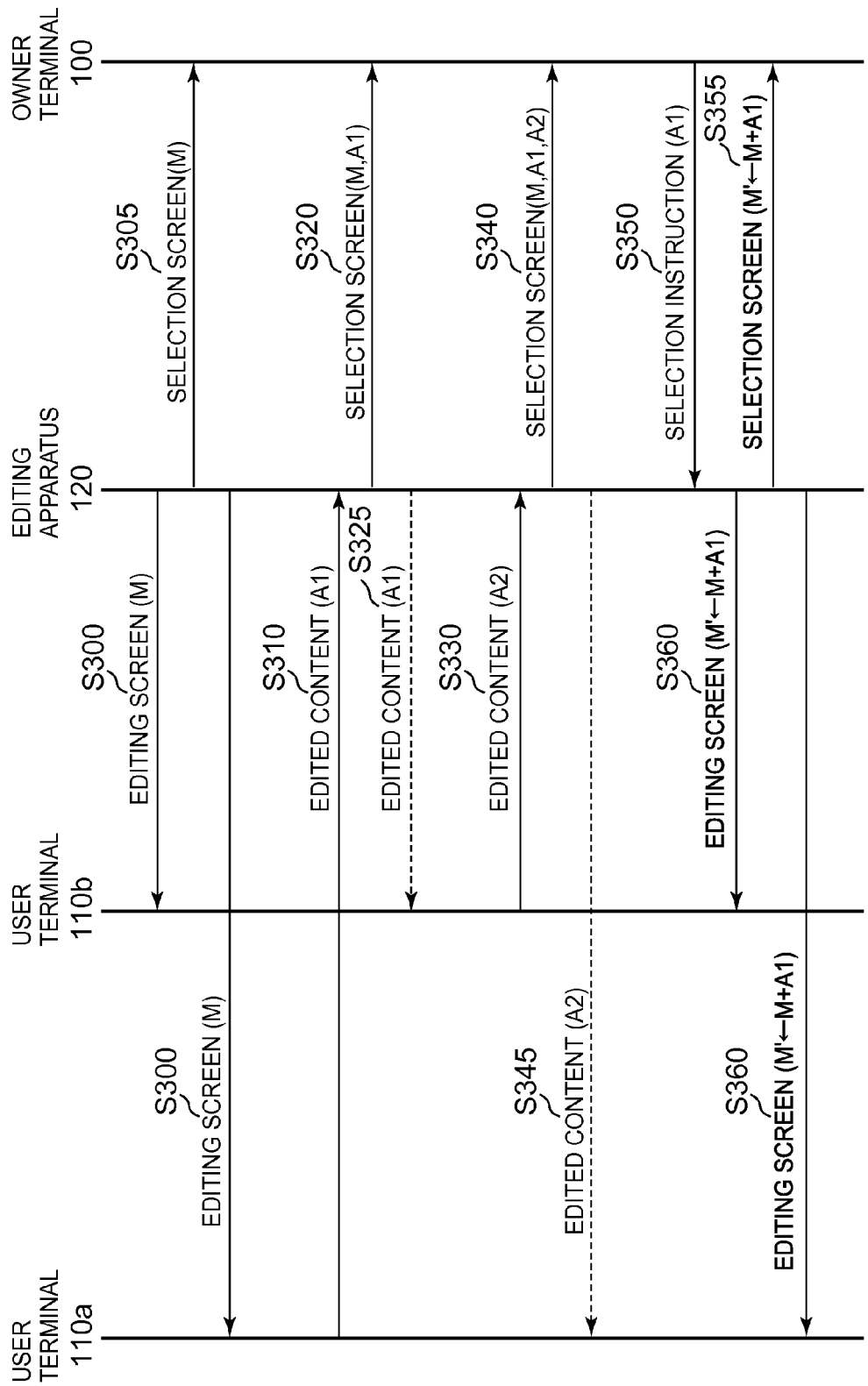
FIG. 3 shows a communication flow of the editing system according to an embodiment.

FIG. 3 shows a communication flow of the editing system 10 according to an embodiment of the present invention. Prior to execution of this communication flow, the editing apparatus 120 registers or authenticates each of the owner terminal 100 and the user terminals 110 on which a collaborative document is edited. As an example, the editing apparatus 120 may provide a screen such as a Web page for registration or authentication to each of the owner terminal 100 and the user terminals 110, and instruct the owner and the users to enter their IDs for registration, or to enter their IDs and passwords for authentication. Further, prior to this communication flow, the screen output section 210 may store, in the master storage section 200, a document to be edited. Alternatively, the owner and the users may start creating a document in collaboration with each other.

First, the screen output section 210 sends a copy of at least part of a document stored in the master storage section 200 to each of the user terminals 110 to output an editing screen including the copy (S300). The screen output section 210 also sends a selection screen to the owner terminal 100 to allow the owner to input a selection instruction, and outputs the selection screen on the owner terminal 100 (S305).

Next, if a user A operates the editing screen on user terminal 110a to edit the copy of the document, the operation input section 220 in the editing apparatus 120 receives, from the user terminal 110a, edited content of the copy edited by user A operating the editing screen on the user terminal 110a (S310). Upon receipt of the edited content, the screen output section 210 sends, to the owner terminal 100, a selection screen in which the received edited content is reflected (S320). The screen output section 210 also sends the edited content received from the user terminal 110a to the other user terminal 110b to instruct the user terminal 110b to display the edited content as a reference screen (S325). Upon receipt of the reference screen, user B of the user terminal 110b can refer to the edited content being edited by user A.

Next, if user B operates the editing screen on the user terminal 110b to edit the copy of the document, the operation input section 220 in the editing apparatus 120 receives, from the user terminal 110b, content of the copy edited by user B operating the editing screen on the user terminal 110b (S330). Upon receipt of the edited content, the screen output section 210 sends, to the owner terminal 100, a selection screen in which the received edited content is reflected (S340). Thus, the screen output section 210 sends the edited content from the users to the owner through the owner terminal 100. The screen output section 210 also sends the edited content from the user terminal 110b to the other user terminal 110a to display the edited content on the user terminal 110a as the reference screen (S345). Upon receipt of the reference screen, user A of user terminal 110a can refer to the content being edited by user B.

Next, the operation input section 220 receives, from the owner through the network 130, input of a selection instruction for specifying an edited content to be reflected in the document from the edited content output to the owner (S350). In other words, if the owner selects the edited content from user A on the selection screen displayed on the owner terminal 100, the operation input section 220 receives, from the owner terminal 100 through the network 130, a selection instruction that the edited content from user A should be selected. Upon receipt of this selection instruction, the operation input section 220 instructs the update section 250 to reflect the edited content from user A in the master of the document.

After the edited content from user A is reflected in the master of the document, the screen output section 210 sends a copy of at least part of the updated document to the user terminals 110a and 110b, respectively (S360). Upon receipt of this copy, each of the user terminals 110a and 110b output an editing screen including the copy of the updated document so that it can further receive new edited content of the updated document from the other user. The screen output section 210 also sends a selection screen for the updated document to the owner terminal 100 to output the selection screen on the owner terminal 100 (S355).

Figure 4:
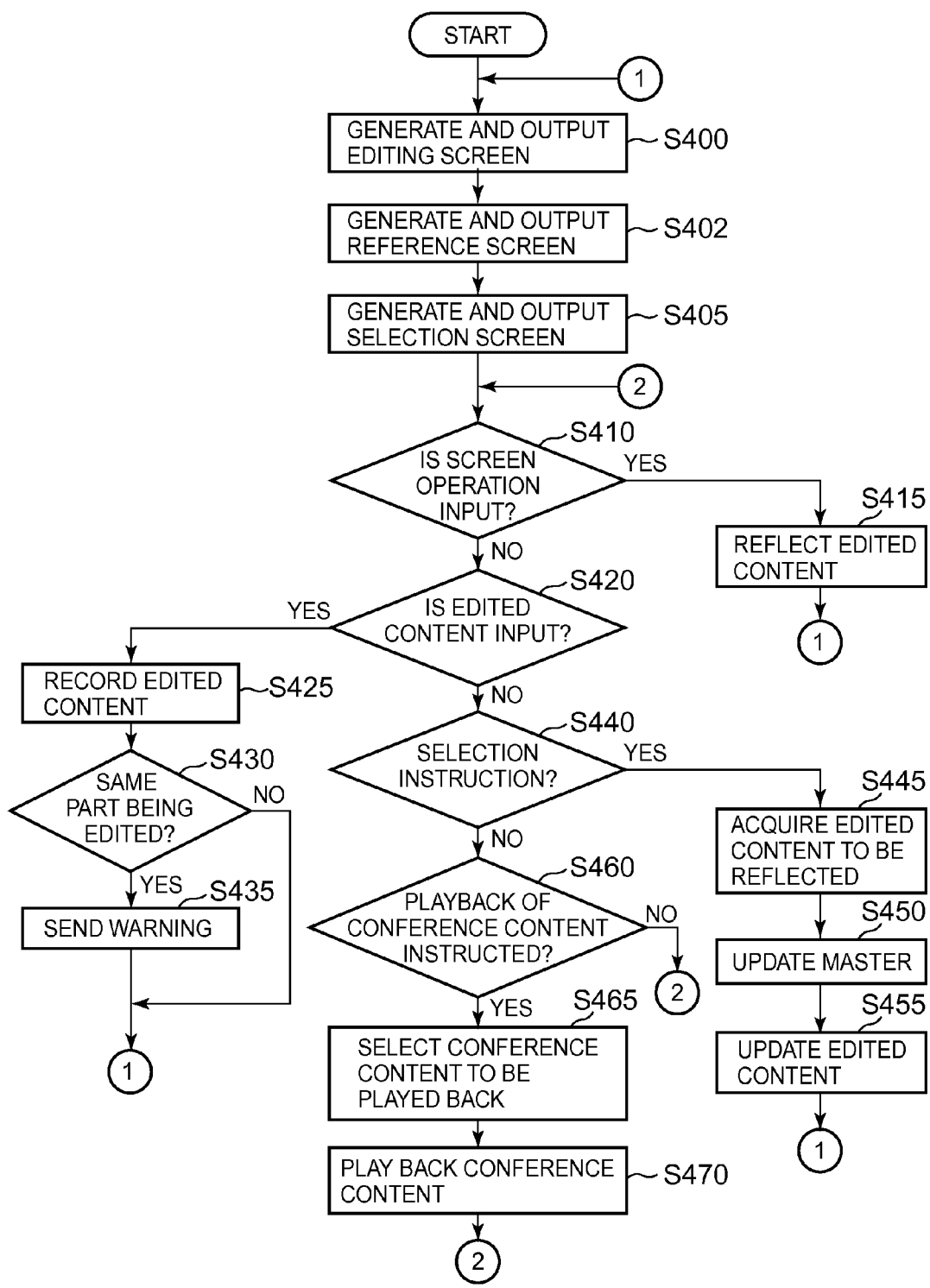
FIG. 4 is a flowchart showing an operation flow of the editing system according to an embodiment.

FIG. 4 shows the operational flow of the editing system 10 according to an embodiment. The screen output section 210 in the editing apparatus 120 sends to the terminals 110, a copy of at least part of the master of the document stored in the master storage section 200 to output an editing screen including the copy on the user terminals 110, respectively (S400). If already receiving edited content from each user terminal 110, the screen output section 210 outputs to the user terminals 110, an editing screen in which the edited content input through the user terminal 110 is reflected in the master of the document, but the edited content input through the other terminal is not reflected. Thus, the screen output section 210 allows each user to edit the document using the editing screen in which only his or her own edited content is reflected in the master of the document.

As an example, the screen output section 210 may send screen data for displaying the editing screen to a client program running on each user terminal 110. In this case, each user terminal 110 executes the client program and uses the client program function to display the editing screen based on the received screen data. Alternatively, the screen output section 210 may generate and hold a Web page for displaying the editing screen through a browser running on each user terminal 110. In this case, each user terminal 110 accesses the Web page through the browser to display the editing screen. Further, the screen output section 210 may send to the user terminals 110, the entire master of the document, or at least part of the master, e.g., a portion to be displayed on each user terminal 110.

Then, the screen output section 210 in the editing apparatus 120 generates a reference screen for displaying an edited content from the other user on the user terminal 110 of each user, and outputs the reference screen to each of the user terminals 110, respectively (S402). For one user, the screen output section 210 reads, from the edited content recording section 230, the edited content received from the user terminal 110 used by the other user and currently being edited by the other user to generate the reference screen to be displayed on the user terminal of the user concerned. Then, the screen output section 210 outputs the generated reference screen to the user terminal 110. The screen output section 210 in the editing apparatus 120 also generates the selection screen for allowing the owner to enter a selection instruction, and outputs the generated selection screen to the owner terminal 100 (S405).

Then, the operation input section 220 receives an operation by the owner or each user from the owner terminal 100 or each user terminal 110. If receiving a screen operation, such as scrolling of the screen, or reading, saving, or switching the document to be edited (YES in S410), the operation input section 220 instructs the screen output section 210 to change the editing screen, the reference screen, or the selection screen according to the screen operation. Upon receipt of this instruction, the screen output section 210 generates an editing screen, a reference screen, or a selection screen in which the screen operation is reflected, and sends the generated screen to the terminal from which the screen operation has been sent (S415).

When receiving edited content from each user terminal 110 (YES in S420), the operation input section 220 records the received edited content in the edited content recording section 230 (S425). Here, the operation input section 220 receives identification information, which indicates which of the document parts is being edited on a corresponding user terminal 110, from each of the user terminals together with its edited content. Then, the operation input section 220 records the identification information and a timestamp in the edited content recording section 230 together with the edited content.

Further, the warning sending section 260 checks whether edited content to which the same identification information is attached are recorded in the edited content recording section 230 to check whether the same document part is being edited on two or more user terminals 110 (S430). If the same document part is being edited on two more user terminals 110 (YES in S430), the warning sending section 260 sends a warning message to the two or more user terminals 110, respectively, and advances processing to S400 (S435).

When receiving a selection instruction from the owner terminal 100 (YES in S440), the operation input section 220 instructs the update section 250 to reflect the selected edited content in the document. Upon receipt of this instruction, the update section 250 acquires the edited content selected by the selection instruction from the edited content recording section 230 (S445), and reflects the edited content in the master of the document stored in the master storage section 200 (S450). When the operation input section 220 receives a selection instruction that edited content of at least one document part edited by a user selected from among edited content from respective users should be reflected in the document, the update section 250 reflects the edited content concerned in the document. Thus, the update section 250 can control, on a user-by-user basis, whether each edited content should be reflected in the document, instead of reflecting all the edited content from the users together in the document.

Then, the update section 250 updates the edited content stored in the edited content recording section 230, and advances processing to S400 (S455). The screen output section 210 updates, to the content updated by the update section 250, the content corresponding to at least one document part reflected in the document on the editing screen sent to each of the owner terminal 100 and the user terminals 110, and displays the updated content.

When determining that the same document part is being edited on two or more user terminals 110, the update section 250 resolves a conflict in editing the same document part as follows. In response to input of a selection instruction that an edited content on one terminal 110 should be reflected in the document, the update section 250 reflects the edited content on the one user terminal 110, while discarding an edited content(s) of the document part on a user terminal(s) other than the one user terminal 110 among two or more user terminals. On the other hand, when different document parts are being edited on two or more user terminals 110, even if reflecting one edited content in the document, the update section 250 may leave the other edited content(s) without discarding it.

When receiving a playback instruction for conference content from the owner terminal 100 or any of the user terminals 110 (YES in S460), the conference content playback section 290 selects a conference content to be played back from the conference recording section 280 (S465). Then, data of the selected conference content is sent to the requesting owner terminal 100 or user terminal 110 to play back the content on the terminal concerned (S470).

When starting cooperative editing of a document in S400, and/or in response to receiving a request from each user, the screen output section 210 may generate layers for inputting a series of edited content determined by the user to reflect them in the document simultaneously in order to send to each user terminal 110, a screen for editing each of the layers. The screen output section 210 may also generate a selection screen for allowing the owner to input a selection instruction for selecting an edited content from each user on a layer-by-layer basis to output the generated selection screen to the owner terminal 100. This allows the editing apparatus 120 to reflect plural edited content all together in the document in response to selection of the layers even if the edited content to be reflected simultaneously are distributed in the document.

Figure 5:
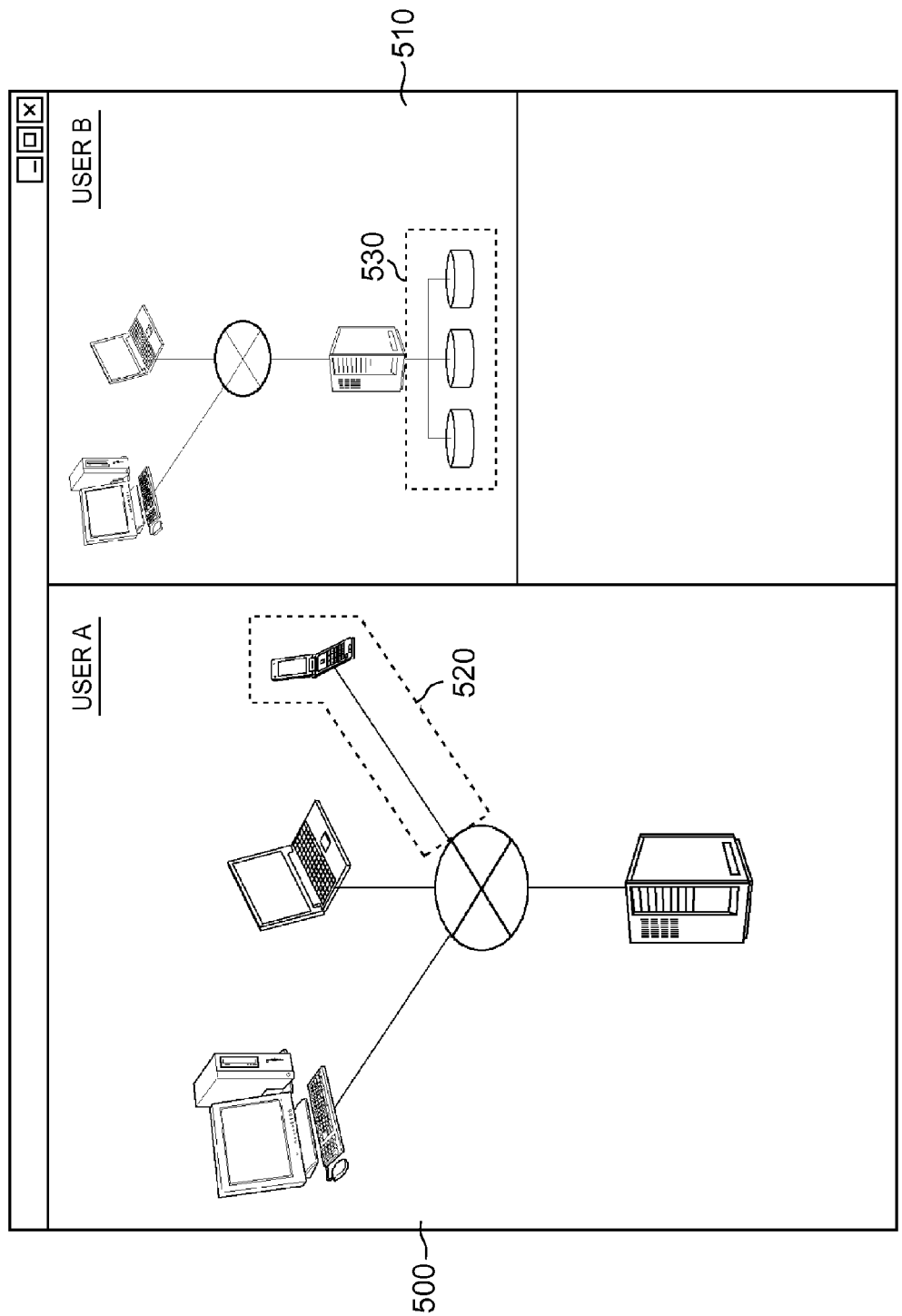
FIG. 5 shows an exemplary screen displayed on a user terminal according to an embodiment.

FIG. 5 shows a typical example of the screen displayed on the user terminal 110a according to the present invention. On the user terminal 110a, an editing screen 500 and a reference screen 510 received from the screen output section 210 are displayed. The editing screen 500 is a screen in which edited content 520 input through the user terminal 110a is reflected in the master of the document. An edited content 530 input through the other user terminal 110b is not displayed on the editing screen 500.

The reference screen 510 is a screen in which the edited content 530 input through the other user terminal 110b is reflected. The user of the terminal 110a can enter his or her own edited content on the editing screen 500 while referring to the reference screen 510. When the number of other users is two or more, the user terminal 110a may display two or more reference screens 510 for respective users. Here, the screen output section 210 may output, to each user, a reference screen 510 for allowing the user to edit content being edited by another user by copying it from the reference screen 510 to the editing screen 500. In other words, the screen output section 210 displays on the user terminal 110a, the reference screen 510 from which part of an entire edited content 530 input by the other user can be copied, and displays on the user terminal 110a, the editing screen 500 to which the copied content can be pasted. This allows each user to create his or her own edited content efficiently using the edited content of the other user.

Further, when receiving a warning message from the warning sending section 260, the user terminal 110a may display a warning to the user of the user terminal 110a. As an example, the user terminal 110a may display the warning by highlighting the reference screen 510 of the other user who is editing the same document part (e.g., by changing the background color or the outer frame color). Alternatively, the user terminal 110a may be provided with a warning indicator on its screen (e.g., in the editing screen 500) to inform the user. Further, in response to input of an instruction to check a warning from user A, the user terminal 110a may inquire about the presence or absence of a warning message to the warning sending section 260 to display the warning when there is a warning message.

Figure 6:
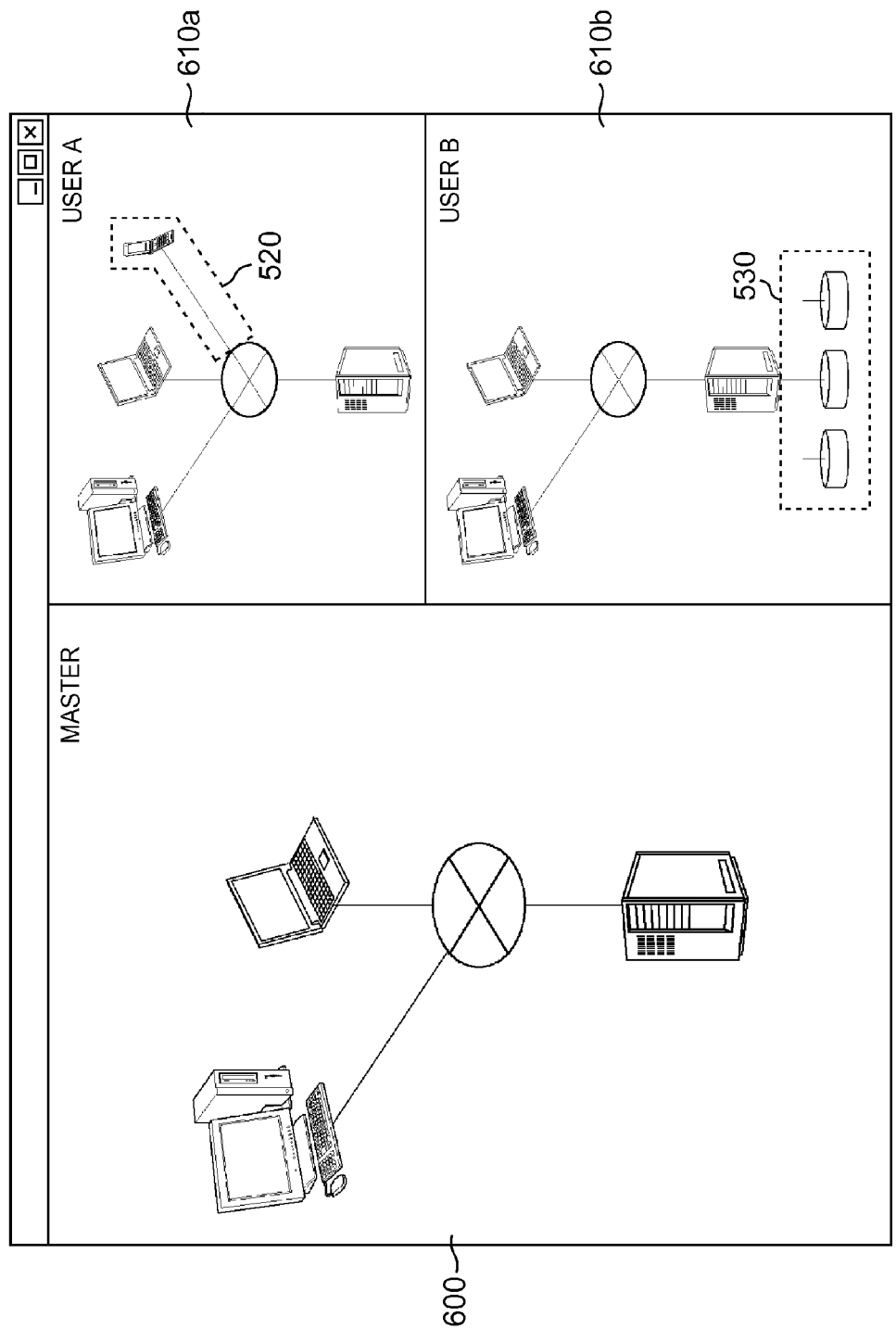
FIG. 6 shows an exemplary screen displayed on a owner terminal according to the embodiment.

FIG. 6 shows an example of a screen to be displayed on the owner terminal 100 according to an embodiment. As a selection screen received from the screen output section 210, a master screen 600 displays the latest state of the master of the document. Editing screens 610a and 610b display content on the respective user terminals 110 on the owner terminal 100.

As an example, the editing screens 610a and 610b may be the same screen as the editing screen 500 displayed on each user terminal 110 shown in FIG. 5. The owner terminal 100 may recognize as a mouse (or the like) selection by the owner of edited content from among the edited content 520 and 530 displayed on the editing screens 610a and 610b, respectively. Alternatively, the owner terminal 100 may recognize, as being selected by the owner, edited content dragged and dropped by the owner of the document onto the master screen 600 from among the edited contents 520 and 530 displayed on the editing screens 610a and 610b, respectively. In response to receiving such a selection instruction from the owner, the owner terminal 100 sends the editing apparatus 120 the selection instruction including identification information indicative of the selected edited content.

The owner terminal 100 may combine edited content from respective users to be selectable in various units such as users, layers, or document parts. This allows the owner to select a proper unit to be reflected in the document and hence continue cooperative editing efficiently.

FIG. 7 shows an example of a table stored in the edited content recording section 230 according to an embodiment. The operation input section 220 records, in the edited content recording section 230, the edited content received from the user terminals 110 in association with identification information of the user who entered the edited content, identification information for identifying the document part, a timestamp, and acceptance/rejection information. If the edited content is managed in units of layers, the operation input section 220 records the edited content in the edited content recording section 230 in association with layer identification information.

A user field is used to identify a user who entered edited content(s). In response to a selection instruction that all edited content input by a specific user should be selected, the update section 250 searches the edited content recording section 230 for all entries whose user fields match the identification information of the user concerned, and acceptance/rejection information fields are all "undecided," to reflect edited content of these entries in the document.

A layer field is used to identify one or more layers generated by each user. In response to a selection instruction that a specific layer of a specific user should be selected, the update section 250 searches for all entries whose user fields match the identification information of the user concerned. The layer fields match the identification information of the layer concerned, and the acceptance/rejection information fields are all "undecided," to reflect edited contents of these entries in the document.

A document part field is used to identify a document part corresponding to edited content. In response to a selection instruction that a specific edited content should be selected, the update section 250 searches for an entry whose document part field matches the identification information of the document part document specified by the selection instruction, and the acceptance/rejection information field is "undecided," to reflect the edited content of the entry in the document.

A timestamp field indicates the date and/or time on which edited content was input. When the owner or a user who desires playback of a conference content specifies any of the edited content stored in the edited content recording section 230, the conference content playback section 290 in the editing apparatus 120 plays back a portion including the time of the timestamp corresponding to the edited content specified. This allows the editing apparatus 120 to play back conference content when the specified edited content was input, and, hence, allows the owner or the user to decide on acceptance or rejection of the edited content or revise his or her own edited content while checking discussions thereon at that time. Here, the conference content playback section 290 may play back the conference content in a preset time range including the time of the timestamp, that is, for example, a time range specified by the owner or the user, or a time range set by default.

The acceptance/rejection information field indicates whether a corresponding edited content is accepted or rejected, or its acceptance or rejection is undecided. When receiving an edited content from each user terminal 110, the operation input section 220 stores it in the edited content recording section 230 with its acceptance/rejection information field set to "undecided." The update section 250 sets "accepted" in acceptance/rejection information field of edited content selected by the owner. Then, if any edited content is discarded, the update section 250 sets "rejected" in its acceptance/rejection information field. Thus, since both the entries whose edited contents are set as accepted and rejected, respectively, remain in the edited content recording section 230, the editing apparatus 120 is able to play back conference content even if edited content whose acceptance or rejection has already been decided is specified to make it possible to recheck the discussions in which rejection was decided.

Alternatively, the update section 250 may delete edited content already reflected in the master while adding an update history including the edited content and timestamp to the master of the document. This allows the conference content playback section 290 to play back a portion including the edited content specified in the conference content by acquiring the timestamp from the update history.

Figure 8:
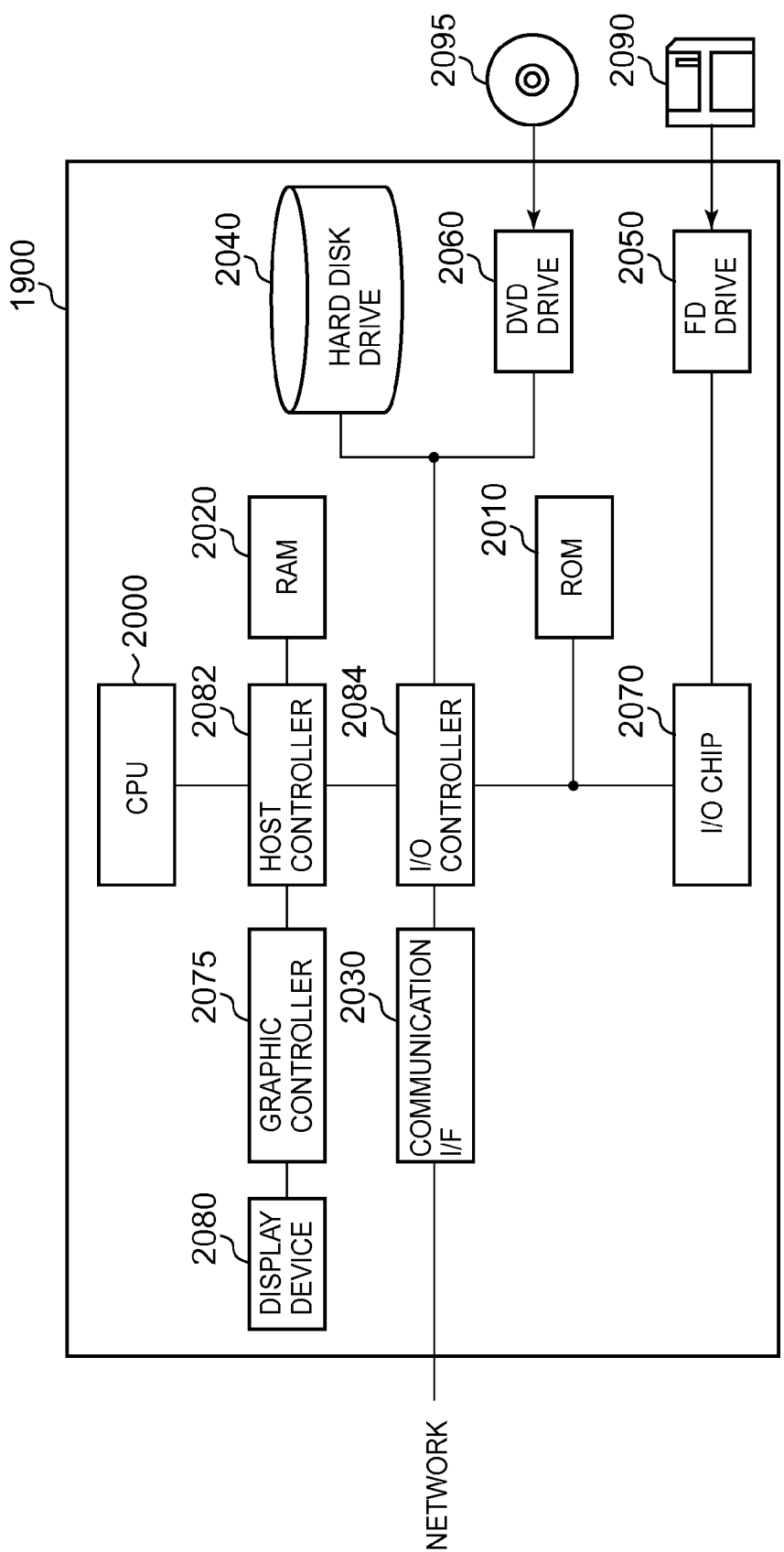
FIG. 8 is a block diagram showing an example of a hardware configuration of a computer according to an embodiment.

FIG. 8 shows an example of a hardware configuration of a computer 1900 according to an embodiment of the present invention. The computer 1900 includes: a CPU 2000, a RAM 2020, a graphic controller 2075, and a CPU peripheral section having a display device 2080, all of which are interconnected by a host controller 2082; a communication interface 2030 and an input/output section having a hard disk drive 2040 and a DVD drive 2060, all of which are connected to the host controller 2082 through an input/output controller 2084; and a ROM 2010, a flexible disk drive 2050, and a legacy I/O section having an input/output chip 2070, all of which are connected to the input/output controller 2084.

The host controller 2082 connects the RAM 2020 to the CPU 2000 and the graphic controller 2075 that accesses the RAM 2020 at a high transfer rate. The CPU 2000 operates based on programs stored in the ROM 2010 and the RAM 2020 to control each section. The graphic controller 2075 acquires image data created by the CPU 2000, or the like, in a frame buffer provided in the RAM 2020 to display the image data on the display device 2080. Alternatively, the graphic controller 2075 may include a frame buffer for internally storing image data created by the CPU 2000, or the like.

The Input/output controller 2084 connects the host controller 2082 to the communication interface 2030, the hard disk drive 2040, and the DVD drive 2060, all of which are relatively high-speed I/O devices. The communication interface 2030 communicates with other devices through a network. The hard disk drive 2040 stores programs and data used by the CPU 2000 in the computer 1900. The DVD drive 2060 reads a program or data from a DVD 2095 to provide it to the hard disk drive 2040 through the RAM 2020.

The ROM 2010, the flexible disk drive 2050, and the input/output chip 2070, all of which are relatively low speed I/O devices, are connected to the input/output controller 2084. The ROM 2010 stores a boot program executed upon startup of the computer 1900 and/or programs and the like dependent on the hardware of the computer 1900. The flexible disk drive 2050 reads a program or data from a flexible disk 2090 to provide it to the hard disk drive 2040 through the RAM 2020. The input/output chip 2070 connects not only the flexible disk drive 2050 to the input/output controller 2084, but also various input/output devices to the input/output controller 2084 through, for example, a parallel port, a serial port, a keyboard port, or a mouse port.

The program provided to the hard disk drive 2040 through the RAM 2020 is provided by a user in the form of being stored on a recording medium such as an IC card. The program is read from the recording medium, installed in the hard disk drive 2040 inside the computer 1900 through the RAM 2020, and executed by the CPU 2000.

A program installed on the computer 1900 to cause the computer 1900 to function as the editing apparatus 120 includes a master storage management module for managing the master storage section 200, a screen output module, an operation input module, an edited content recording management module for managing the edited content recording section 230, an update module, a warning sending module, a conference content receiving module, a conference recording module for managing the conference recording section 280, and a conference content playback module. These program instructions or modules work on the CPU 2000 or the like to cause the computer 1900 to function as the master storage section 200, the screen output section 210, the operation input section 220, the edited content recording section 230, the update section 250, the warning sending section 260, the conference content receiving section 270, the conference recording section 280, and the conference content playback section 290, respectively.

Information processing described in these program instructions is read into the computer 1900 to function as specific means implemented by software in cooperation with the above-mentioned various hardware resources, namely, the screen output section 210, the operation input section 220, the update section 250, the warning sending section 260, the conference content receiving section 270, and the conference content playback section 290. Then, these specific means achieve information computations or processing depending on the purpose of use of the computer 1900 in the embodiment, thus constructing the specific editing apparatus 120 depending on the purpose of use.

As an example, when the computer 1900 communicates with an external device, the CPU 2000 executes a communication program loaded on the RAM 2020, and based on the processing content described in the communication program, the CPU 2000 instructs the communication interface 2030 to perform communication processing. Under the control of the CPU 2000, the communication interface 2030 reads transmit data stored in a transmit buffer area provided in a storage device, such as the RAM 2020, the hard disk drive 2040, the flexible disk 2090, or the DVD 2095, and sends it to the network, or the communication interface 2030 writes receive data received from the network to a receive buffer provided in the storage device. Thus, the communication interface 2030 may transfer sent and received data to and from the storage device in a DMA (Direct Memory Access) format, or the sent and received data may be transferred in such a manner that the CPU 2000 reads data from the storage device or the communication interface 2030 as the sender, and writes data to the communication interface 2030 or the storage device as the destination.

The CPU 2000 also reads, into the RAM 2020 through DMA transfer or the like, all or necessary data from among files or databases stored in the external storage device, such as the hard disk drive 2040, the DVD drive 2060 (DVD 2095), or the flexible disk drive 2050 (flexible disk 2090) or other computer readable storage media, to perform various processing on the data on the RAM 2020. Then, the CPU 2000 writes the processed data back to the storage device through DMA transfer or the like. In such processing, since the RAM 2020 can be considered to temporarily hold the contents of the external storage device, the RAM 2020, the external storage device and the like are collectively called a memory, storage section, storage device, etc. in the embodiment. In the embodiment, various pieces of information, such as various programs, data, tables, and databases, are stored in the storage device as targets for information processing. Note that part of the data on the RAM 2020 may be held in a cache memory so that the CPU 2000 can perform reading and writing on the cache memory. Even in this form, since the cache memory has part of the function of the RAM 2020, the cache memory is also considered in the embodiment to be included in the RAM 2020, the memory, and/or the storage device, unless otherwise distinguished.

Further, the CPU 2000 performs various processing on data read from the RAM 2020, including various computations, information processing, condition determinations, information searching/replacement described in the embodiment and specified in command procedures of the programs, and writes the processed data back to the RAM 2020. For example, when making a condition determination, the CPU 2000 determines whether various variables shown in the embodiment satisfy conditions that are larger than, smaller than, no less than, no more than, equal to, etc. other variables or constants, and if a condition is satisfied (or unsatisfied), the CPU 2000 branches processing to a different command procedure or calls a subroutine.

The CPU 2000 is also capable of searching for information stored in a file or database inside the storage device. For example, when plural entries in each of which an attribute value of a second attribute is associated with an attribute value of a first attribute are stored in the storage device, the CPU 2000 searches for an entry in which the attribute value of the first attribute matches a specified condition, and reads the attribute value of the second attribute stored in the entry so that the attribute value of the second attribute associated with the first attribute that satisfies the predetermined condition can be obtained.

The programs or modules mentioned above may be stored in an external recording medium. In addition to the flexible disk 2090 and the DVD 2095, optical recording media, such as a DVD or CD, a magneto-optical recording medium such as an MO, a tape medium, a semiconductor memory such as an IC card, etc. can also be used as recording media. Further, a storage device such as a hard disk or a RAM provided in a server system connected to a private communication network or the Internet may be used as a recording medium to provide a program to the computer 1900 through the network.

While the present invention has been described above in connection with an embodiment, the technical scope of the present invention is not limited to the scope described in the embodiment. It will be obvious to one having ordinary skill in the art that various modifications or alterations of the embodiment can be made. Therefore, embodiments for which these modifications or alterations have been made are also included in the technical scope of the present invention.

An execution sequence of each processing such as an operation, procedure, step, or stage, in an apparatus, system, program, and method described in appended claims and this specification, and shown in the accompanying drawings is not particularly specified using explicit expressions such as "ahead of" and "prior to." It should be noted that each processing can be performed in any order unless output of the previous processing is used in the following processing. Even if the operation flow described in the appended claims and this specification or shown in the drawing has been described using expressions such as "first" and "next," it does not means that it is indispensable to perform the operation flow in this order.

The functions of the editing apparatus 120 may also be implemented by a program running on one or more terminals among the owner terminal 100 and the plural user terminals 110. In this case, the terminal or a terminal group functions as the editing apparatus 120.

Further, the owner of the document may be predetermined for each document in a fixed manner, or may be flexibly changed according to the progress of cooperative editing. For example, the editing apparatus 120 may set an owner individually for each document part. Alternatively, the editing apparatus 120 may set, as an owner for each document part, a user who is the last to update the document part.

Further, the operation input section 220 may receive, as a selection instruction from the owner of the document, an owner's change in the selected edited content in addition to the identification information for identifying the selected edited content. In this case, upon receipt of this owner's change, the update section 250 adds the change received by the operation input section 220 to the edited content stored in the edited content recording section 230 to reflect the edited content in the master of the document. This allows the owner to select an edited content to be reflected in the document and reflect the edited content in the document after adding a change(s) to the edited content.

Further, the editing system 10 may perform communication in real time, such as transmission of the selection screen and the editing screen/reference screen from the editing apparatus 120 to the owner terminal 100 and the user terminals 110, and transmission of edited contents from the user terminals 110 to the editing apparatus 120. Alternatively, for example, when the owner or a user instructs a screen update or transmission of an edited content, the editing system 10 may perform communication on the instruction.

What is claimed is:

1. An editing apparatus for allowing a plurality of users to edit a same document in parallel, comprising:
    a screen output section for outputting to each of a plurality of terminals used by the users, an editing screen to edit the same document in parallel with other said terminals;
    an operation input section for receiving, from said terminals, edited content from the users input by operating said editing screen on said terminals;
    said screen output section further outputting to a terminal used by one of the users a reference screen received from a terminal used by another of the users and displaying content being edited by said other of the users;
    said screen output section outputting to said terminal used by said one of the users said reference screen in order to allow said one of the users to copy said content being edited by said other of the users and paste said content onto said editing screen so that said one of the users can edit said content being edited by said other of the users;
    the document includes a plurality of parts, and the operation input section further receives, respectively from said plurality of terminals, identification information indicative of which of said document parts is being edited on each of said plurality of terminals;
    the editing apparatus further comprises a warning sending section for sending two or more of said plurality of terminals a warning message when determining that a same document part is being edited on said two or more of said plurality of terminals at a same time;
    a selection input section for inputting from an administrator of the same document, an instruction for selecting from among said edited content from the users, edited content to be reflected in the same document; and
    an update section for reflecting in the same document said edited content to be reflected in the same document, and for updating the same document.

2. The editing apparatus of claim 1, wherein said screen output section further outputs to said administrator said edited content from the users.

3. The editing apparatus of claim 2, wherein:
    said screen output section sends a copy of at least part of the document to said plurality of terminals to output said editing screen including said copy of at least part of the document onto said terminals; and
    said operation input section receives from said terminals said edited content of editing said copy of at least part of the document by the users operating said editing screen on said terminals.

4. The editing apparatus of claim 1, wherein said screen output section outputs to said plurality of terminals, said editing screen in which edited content of a master of the document input through a selected terminal is reflected and edited content input through others of said terminals is not reflected.

5. The editing apparatus of claim 1, further comprising:
    an edited content recording section for recording a plurality of edited content received from said plurality of terminals together with timestamps, respectively;
    a conference recording section for recording conference content comprising video, conversation, or chat content of a conference among the users and said administrator; and
    a conference content playback section for playing back a portion of said conference content including a time of said timestamps corresponding to one of said plurality of edited content from the users specified by any one of the users or said administrator.

6. The editing apparatus of claim 1, wherein when it is determined that a same document part is being edited on said two or more of said plurality of terminals, said update section reflects a first edited content in the document in response to input of an instruction for selecting by said administrator, and a second edited content should be discarded.

7. The editing apparatus of claim 1, wherein:
    the document includes a plurality of document parts, said update section reflects an edited content when said selection input section inputs said instruction for selecting an edited content of at least one of said plurality of document parts edited by one of the users; and
    said screen output section updates said edited content of at least one of said plurality of document parts edited by one of the users updated by said update section, said updated content corresponding to said at least one document part on the editing screen sent to said plurality of terminals.

8. A computer program product for causing a computer to function as an editing apparatus for allowing a plurality of users to edit a same document in parallel, the computer program product comprising a computer readable storage device having computer usable program code embodied therewith, comprising:
    computer usable program code configured to create a screen output section for outputting to each of a plurality of terminals used by the users, an editing screen to edit the same document in parallel with other said terminals;
    computer usable program code configured to create an operation input section for receiving, from said terminals, edited content from the users input by operating said editing screen on said terminals;
    computer usable program code configured to output to a terminal used by one of the users a reference screen received from a terminal used by another of the users and display content being edited by said other of the users;
    computer usable program code configured to output to said terminal used by said one of the users said reference screen in order to allow said one of the users to copy said content being edited by said other of the users and paste said content onto said editing screen so that said one of the users can edit said content being edited by said other of the users;
    computer usable program code configured to receive at the operation input section, respectively from said plurality of terminals, identification information indicative of which of said document parts is being edited on each of said plurality of terminals;
    computer usable program code configured to send a warning message to two or more of said plurality of terminals when determining that a same document part is being edited on said two or more of said plurality of terminals at a same time;
    computer usable program code configured to create a selection input section for inputting from an administrator of the same document, an instruction for selecting from among said edited content from the users, edited content to be reflected in the same document; and
    computer usable program code configured to create an update section for reflecting in the same document said edited content to be reflected in the same document, and for updating the same document.

9. An editing method for causing a computer to allow a plurality of users to edit a same document in parallel, the method comprising the steps of:

outputting with a screen output section to each of a plurality of terminals used by the users, an editing screen to edit the same document in parallel with other said terminals;

receiving from said terminals with an operation input section edited content from the users input by operating said editing screen on said terminals;

outputting to a terminal used by one of the users a reference screen received from a terminal used by another of the users and displaying content being edited by said other of the users;

outputting to said terminal used by said one of the users said reference screen in order to allow said one of the users to copy said content being edited by said other of the users and paste said content onto said editing screen so that said one of the users can edit said content being edited by said other of the users;

receiving a plurality of document parts at the operation input section, respectively from said plurality of terminals, identification information indicative of which of said document parts is being edited on each of said plurality of terminals;

sending a warning message to two or more of said plurality of terminals when determining that a same document part is being edited on said two or more of said plurality of terminals at a same time;

inputting from an administrator of the same document with a selection input section an instruction for selecting from among said edited content from the users, edited content to be reflected in the same document; and reflecting with an update section said edited content to be reflected in the same document, and for updating the same document.

10. The computer program product of claim 8, further comprising computer usable program code configured to output said edited content from the users to said administrator.

11. The computer program product of claim 10, further comprising:

computer usable program code configured to send a copy of at least part of the document to said plurality of terminals to output said editing screen including said copy of at least part of the document onto said terminals; and computer usable program code configured to receive from said terminals said edited content of editing said copy of at least part of the document by the users operating said editing screen on said terminals.

12. The computer program product of claim 8, further comprising computer usable program code configured to output to said plurality of terminals, said editing screen in which edited content of a master of the document input through a selected terminal is reflected and edited content input through others of said terminals is not reflected.

13. The computer program product of claim 8, further comprising:

computer usable program code configured to record a plurality of edited content received from said plurality of terminals together with timestamps, respectively;

computer usable program code configured to record conference content comprising video, conversation, or chat content of a conference among the users and said administrator; and computer usable program code configured to play back a portion of said conference content including a time of said timestamps corresponding to one of said plurality of edited content from the users specified by any one of the users or said administrator.

14. The computer program product of claim 8, further comprising computer usable program code configured to reflect a first edited content in the document in response to selection, thereof, by said administrator, and discard a second edited content when it is determined that a same document part is being edited on said two or more of said plurality of terminals at said same time.

15. The computer program product of claim 8, further comprising:

computer usable program code configured to reflect an edited content when said selection input section inputs said instruction for selecting an edited content of at least one of said plurality of document parts edited by one of the users; and computer usable program code configured to update said edited content of at least one of said plurality of document parts edited by one of the users updated by said update section, said updated content corresponding to said at least one document part on the editing screen sent to said plurality of terminals.

16. The editing method of claim 9, further comprising said screen output section outputting to said administrator said edited content from the users.

17. The editing method of claim 16, further comprising:

said screen output section sending a copy of at least part of the document to said plurality of terminals and outputting said editing screen including said copy of at least part of the document onto said terminals; and said operation input section receiving from said terminals said edited content of editing said copy of at least part of the document by the users operating said editing screen on said terminals.

18. The editing method of claim 9, further comprising said screen output section outputting to said plurality of terminals, said editing screen in which edited content of a master of the document input through a selected terminal is reflected and edited content input through others of said terminals is not reflected.

19. The editing method of claim 9, further comprising:

editing content for recording a plurality of edited content received from said plurality of terminals together with timestamps, respectively;

recording conference content comprising video, conversation, or chat content of a conference among the users and said administrator; and playing back a portion of said conference content including a time of said timestamps corresponding to one of said plurality of edited content from the users specified by any one of the users or said administrator.

20. The editing method of claim 9, further comprising, reflecting a first edited content in the document in response to selection by said administrator, and discarding a second edited content when it is determined that a same document part is being edited on said two or more of said plurality of terminals.

* * * * *